US010115012B1

(12) United States Patent
Dempsey et al.

(10) Patent No.: US 10,115,012 B1
(45) Date of Patent: Oct. 30, 2018

(54) CAPTURE OBJECT BOUNDARY JITTER REDUCTION

(71) Applicant: Box, Inc., Redwood City, CA (US)

(72) Inventors: Andrew Miller Dempsey, San Francisco, CA (US); James Michael DiZoglio, Los Gatos, CA (US); Oluwatosin Onafowokan, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 20 days.

(21) Appl. No.: 15/482,611

(22) Filed: Apr. 7, 2017

(51) Int. Cl.

| | |
|---|---|
| ***G06K 9/00*** | (2006.01) |
| ***G06K 9/46*** | (2006.01) |
| ***H04N 5/232*** | (2006.01) |
| ***G06K 9/62*** | (2006.01) |
| ***G06T 7/62*** | (2017.01) |
| ***G06T 11/60*** | (2006.01) |

(52) U.S. Cl.
CPC ....... *G06K 9/00463* (2013.01); *G06K 9/4609* (2013.01); *G06K 9/6202* (2013.01); *G06T 7/62* (2017.01); *G06T 11/60* (2013.01); *H04N 5/23222* (2013.01); *H04N 5/23293* (2013.01); *G06T 2207/10016* (2013.01); *G06T 2207/30176* (2013.01); *G06T 2207/30242* (2013.01); *G06T 2210/12* (2013.01)

(58) Field of Classification Search
CPC ..... G06K 9/00463; G06K 9/4609; G06T 7/62
USPC .......................................................... 382/103
See application file for complete search history.

(56) References Cited

U.S. PATENT DOCUMENTS

2017/0070748 A1* 3/2017 Li ........................ H04N 19/176
2017/0126977 A1* 5/2017 Klivington ......... H04N 5/23267

OTHER PUBLICATIONS

"CIDetector", Apple Developer, URL: https://developer.apple.com/documentation/coreimage/cidetector, Mar. 2017, Accessed on Jun. 8, 2018.
"CIRectangleFeature", Apple Developer, URL: https://developerapple.com/documentation/coreimage/cirectanglefeature, Mar. 2017, Accessed on Jun. 8, 2018.

* cited by examiner

*Primary Examiner* — Raj Chakraborty
(74) *Attorney, Agent, or Firm* — Vista IP Law Group, LLP

(57) ABSTRACT

Image processing to reduce or eliminate jitter when visually highlighting a target capture area of an image capture device such as a smart phone or camera. A method embodiment commences upon receiving a sequence of one or more video frames taken by the image capture device. A routine to identify the largest polygons in the video frames is applied to the sequence. Uncertainty in identification of the largest polygons is reduced or eliminated by applying intra-frame filters to the polygons. Visible jitter that can arise from inter-frame uncertainty when selecting and highlighting target capture areas can be reduced or eliminated by applying inter-frame filters so as to retain selection of a particular target capture area even in the presence of certain capture device movements. A jitter-free representation of the target capture area is visually displayed on a display screen of the image capture device.

19 Claims, 9 Drawing Sheets

CAPTURE OBJECT BOUNDARY JITTER REDUCTION

FIELD

This disclosure relates to image processing, and more particularly to techniques for reducing or eliminating jitter in displayed boundaries of captured objects.

BACKGROUND

The digital camera, smart phone, and tablet revolution has greatly increased the prevalence of document sharing. Also increasing is the use of built-in "native" image sensing capabilities (e.g., camera function, video function, etc.) of these devices that can be used to capture an image of a target object (e.g., document) to be shared. Certain object capture operations convert physical content (e.g., paper documents lying on the surface of a desk) to electronically stored objects (e.g., "bitmaps" or "pictures" of the document) that can be uploaded for various purposes (e.g., analysis, storing, sharing, etc.). In many cases, native image processing application programming interfaces (APIs) might be supported by the developer of the operating system of the capture device. Such APIs can be accessed by applications (or "apps") developed by a third-party provider such as a shared content storage service provider. The native APIs facilitate rapid development of various apps such as for document capture and sharing. As an example native API, certain native image processing features that are available from an operating system developer or third-party provider might provide the coordinates of all detected polygons in a particular still image or video frame in response to an API call. This information might then be used to determine the boundary of a target document that the user desires to capture and share.

Unfortunately, relying merely on the native image processing capabilities of a smart phone or digital camera or other digital image capture device can present challenges when determine the boundary of a target document that the user desires to capture and share. Image processing capabilities of the foregoing devices and/or the image processing capabilities of the software that runs on these devices are often deficient, at least in that the native capabilities do not provide enough information about the particular still image or video frame. For example, some image processing approaches merely return a set of polygons that are detected by the native hardware and/or native software. In certain situations that introduce hand or camera movements, or, in the presence of inherent imaging variations (e.g., due to refocusing, lighting or shadow changes, etc.) the set of polygons between each captured frame can change substantially, resulting in instabilities through successive sets of polygons at each frame. Such instabilities can occur, for example, at 30 frames per second (fps), thereby resulting in a temporal inter-frame uncertainty associated with the boundary of the intended target document.

When such an uncertain target document boundary is drawn on the capture screen of the user device, a jitter characteristic is often visually observable, resulting in an annoyance to the user. In some cases, the jitter can result in a boundary that moves (i.e., jitters) between the boundary of the target document and another area of the capture screen. In other cases, the jitter can result in a boundary that does not stably reflect the correct boundary of the intended target document. As an example of this, the largest detected polygon might correctly define or approximate the boundary of the target document in one frame, while in another frame (e.g., a next frame), the defined or approximated boundary might be formed from a polygon comprising three edges of the target document in combination with some other edge that is present in the frame (e.g., another document, a shadow, etc.). In such cases, both a visible jitter and an inaccurate target document boundary might result in undesirable effects that detract from the user's experience with the app.

What is needed is a technological solution for reducing the uncertainty in determining the boundary of a target capture object so as to reduce or eliminate jitter and/or boundary inaccuracy. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for capture object boundary jitter reduction, which techniques advance the relevant technologies to address technological issues with legacy approaches. More specifically, the present disclosure provides a detailed description of techniques used in systems, methods, and in computer program products for reducing capture object boundary uncertainty using intra- and inter-frame polygon filtering. Certain embodiments are directed to technological solutions for applying a filtering scheme to a set of candidate capture object polygons to determine a target object boundary that corresponds, with a statistically high certainty, to the target object.

The disclosed embodiments modify and improve over legacy approaches. In particular, the herein-disclosed techniques provide technical solutions that address the technical problems attendant to image processing uncertainties when determining the boundary of a target capture object. Such technical solutions relate to advances in computer functionality. As one specific example, use of the disclosed techniques and devices within the shown environments provide advances in the technical field of human-machine interface design and implementation as well as advances in various technical fields related to electronic document sharing.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
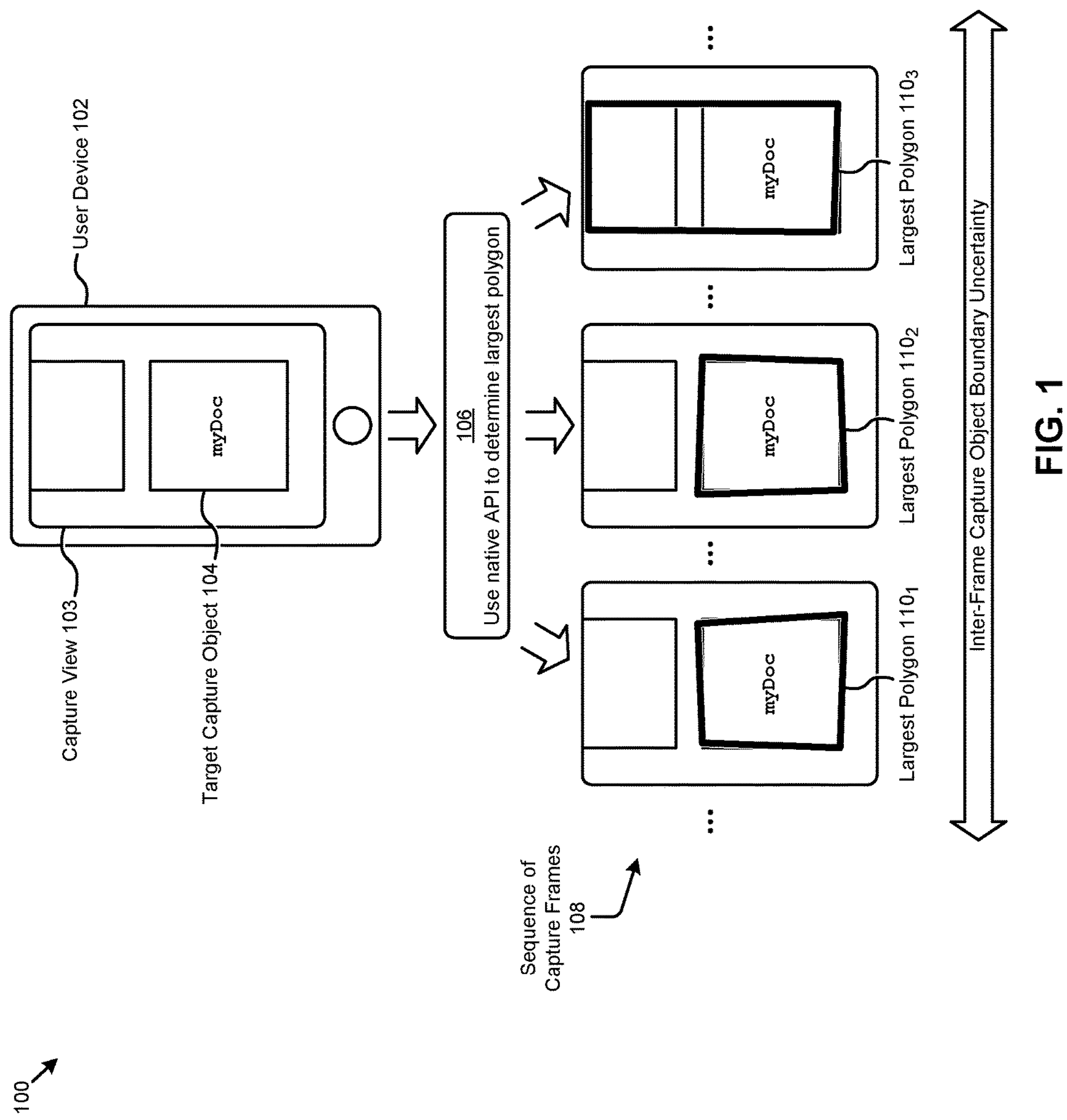
FIG. 1 illustrates a document capture boundary jitter scenario.

Embodiments in accordance with the present disclosure address the problem of image processing uncertainties in determining the boundary of a target capture object. Some embodiments are directed to approaches for applying a filtering scheme to a set of candidate capture object polygons to achieve a quantitatively high degree of certainty when bounding a target capture object. The accompanying figures and discussions herein present example environments, systems, methods, and computer program products for reducing capture object boundary uncertainty using intra- and inter-frame polygon filtering.

Overview

A filtering scheme is applied to a set of candidate capture object polygons to determine a target object boundary that corresponds, with a statistically high certainty, to the boundary of a document or other target object that a user intends to capture as a polygon. In certain embodiments, a document image capture application is invoked to collect a sequence of video frames, within which frames is a target object to be captured and shared. Each frame is analyzed to enumerate the polygons detected in the frame. The polygon coordinates are processed to determine the area and center of each polygon. An intra-frame size filter and an intra-frame position filter are applied to the area and center, respectively, of the polygons to determine a particular candidate object boundary for each frame. An inter-frame filter is applied to the candidate object boundary by comparing the area within the candidate object boundary to the average area of the candidate object boundaries from a specific number of previous frames. If the variance (e.g., difference) between the area and average area is within a predetermined threshold, the candidate object boundary is selected as the target object boundary. If the variance (e.g., difference) between the area and average area breaches the predetermined threshold, the candidate object boundary is rejected.

In certain embodiments, the polygon having the largest area and a center within a target window is selected as the candidate object boundary. In certain embodiments, the area and center of each polygon is derived from a rectangle that bounds the coordinates of the polygon. In certain embodiments, the area of the candidate object boundary for each frame is ingested into a boundary attribute buffer to facilitate calculation of the average area and/or other intra-frame metrics. In certain embodiments, the content of various instances of the boundary attribute buffer is subjected to an inter-buffer quantitative analysis to determine various actions to take. In certain situations, user alerts are offered when “too much” movement (e.g., fast panning or fast zooming) is detected.

Definitions and Use of Figures

Some of the terms used in this description are defined below for easy reference. The presented terms and their respective definitions are not rigidly restricted to these definitions—a term may be further defined by the term’s use within this disclosure. The term “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion. As used in this application and the appended claims, the term “or” is intended to mean an inclusive “or” rather than an exclusive “or”. That is, unless specified otherwise, or is clear from the context, “X employs A or B” is intended to mean any of the natural inclusive permutations. That is, if X employs A, X employs B, or X employs both A and B, then “X employs A or B” is satisfied under any of the foregoing instances. As used herein, at least one of A or B means at least one of A, or at least one of B, or at least one of both A and B. In other words, this phrase is disjunctive. The articles “a” and “an” as used in this application and the appended claims should generally be construed to mean “one or more” unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to “some embodiments” or “other embodiments” refer to a particular feature, structure, material or characteristic described in connection with the embodiments as being included in at least one embodiment. Thus, the appearance of the phrases “in some embodiments” or “in other embodiments” in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a document capture boundary jitter scenario 100. As an option, one or more variations of document capture boundary jitter scenario 100 or any aspect thereof may be implemented in the context of the architecture and functionality of the embodiments described herein.

The document capture boundary jitter scenario 100 or any aspect thereof may be implemented in any environment.

The document capture boundary jitter scenario 100 depicts a user device 102 that is running a document capture application. As can be observed, the user device 102 presents a capture view 103 to guide a user to point at a target capture object 104 (e.g., "myDoc" document) the user intends to capture. As earlier mentioned, a native image processing API (e.g., as provided by Apple's "Core Image Framework") might be used on an image capture device. Additionally, other image processing APIs are supported, for example, "Google Mobile Vision" for Android, or "OpenCV" for many other platforms. Such APIs might be employed by the application to determine the largest polygon in the capture view 103 as an approximation for the boundary of the target capture object 104 (operation 106). However, relying merely on the native image processing capabilities can present challenges. For example, as shown in a sequence of capture frames 108 received by the application, the largest polygon (e.g., largest polygon $\mathbf{110}_1$, largest polygon $\mathbf{110}_2$, and largest polygon $\mathbf{110}_3$) can vary from frame to frame, which variation in turn results in an uncertainty in the approximation of the capture object boundary.

Such inter-frame variation can be due to certain inherent aberrations (e.g., due to refocusing, user movement, light/shadow changes, etc.) between each captured frame that is manifested in variations in the coordinates of the largest detected polygon. For example, the change from largest polygon $\mathbf{110}_1$ to largest polygon $\mathbf{110}_2$ might represent such aberrations. In other cases, the variations can result in a boundary that does not accurately reflect the boundary of the target object. For example, while the largest polygon $\mathbf{110}_2$ closely approximates the boundary of target capture object 104, the largest polygon $\mathbf{110}_3$ does not closely approximate the boundary of target capture object 104 as it comprises three edges of target capture object 104 in combination with some other edge or edges that are present in the frame (e.g., another document above the target capture object 104). When a visual boundary is rendered on user device 102 responsive to the foregoing variations (e.g., at 30 fps) in the largest detected polygon, a visual jitter characteristic can be observed. As mentioned, in some cases, both a visible jitter and an inaccurate target object boundary are produced, where both results detract from the user experience.

Figure 2:
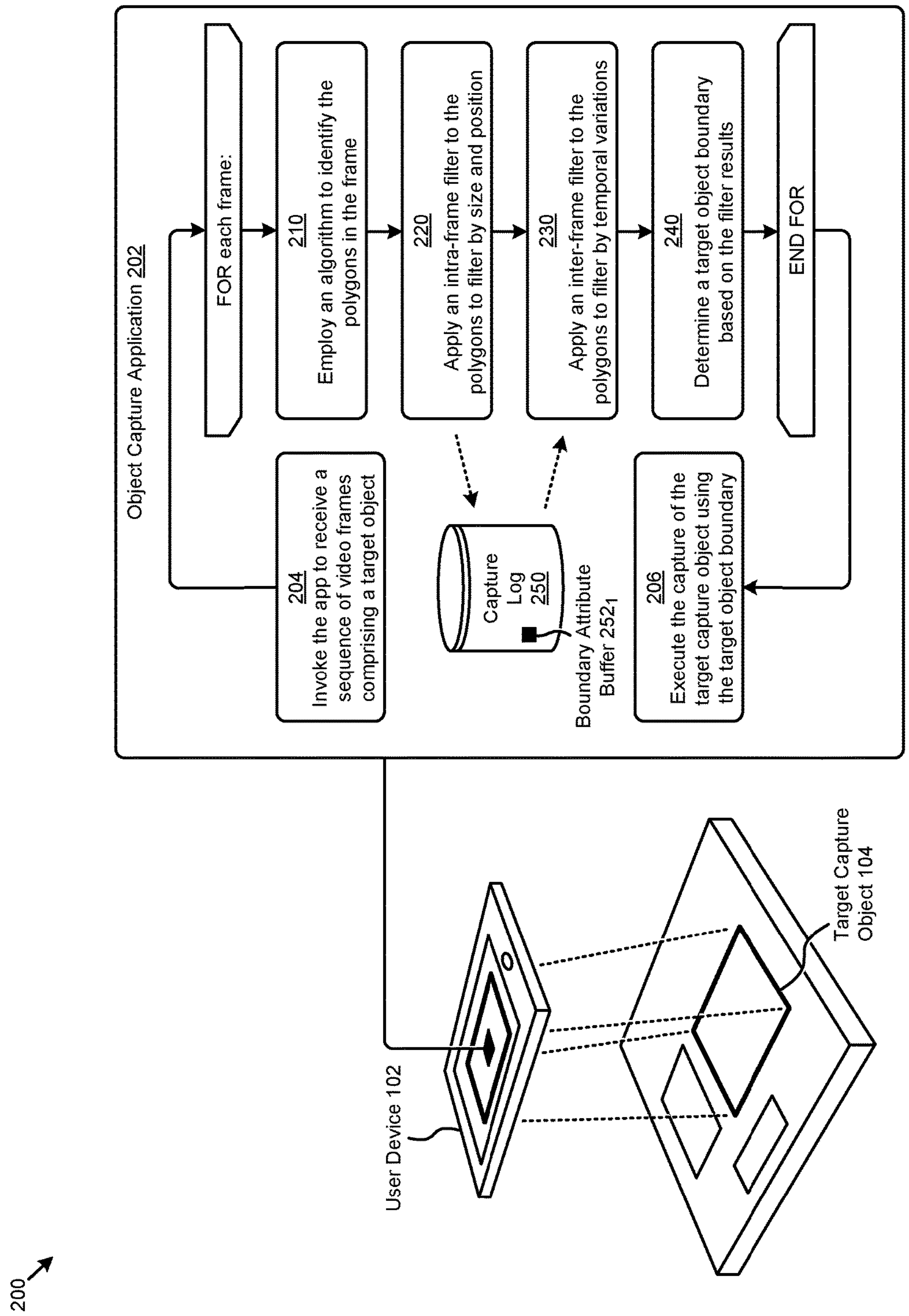
FIG. 2 depicts a capture object boundary selection technique as implemented in systems that reduce capture object boundary uncertainty using intra- and inter-frame polygon filtering, according to an embodiment.

The herein disclosed techniques address such problems attendant to uncertainty in determining the boundary of a target capture object as shown and described as pertaining to FIG. 2.

FIG. 2 depicts a capture object boundary selection technique 200 as implemented in systems that reduce capture object boundary uncertainty using intra- and inter-frame polygon filtering. As an option, one or more variations of capture object boundary selection technique 200 or any aspect thereof may be implemented in the context of the architecture and functionality of the embodiments described herein. The capture object boundary selection technique 200 or any aspect thereof may be implemented in any environment.

The capture object boundary selection technique 200 presents one embodiment of certain steps and/or operations that facilitate capture object boundary uncertainty reduction using intra- and inter-frame polygon filtering. As illustrated, in certain embodiments, the capture object boundary selection technique 200 can be implemented in an object capture application 202 operating on user device 102 to capture a target capture object 104 (e.g., on a desktop). As shown, the capture object boundary selection technique 200 can commence by invoking the app to receive a sequence of video frames comprising a target object (e.g., target capture object) (step 204). For each received frame, a routine (e.g., native image processing capability) is employed to identify the polygons in the frame (step 210). One or more intra-frame filters are applied to the polygons to filter the polygons in accordance with certain polygon attributes, such as a polygon's size and/or a polygon's position (step 220). For example, the largest polygon closest to the center of the capture view might be selected from the set of polygons. In certain embodiments, as shown in FIG. 2, various data accessed and/or generated during the capture process is stored in a capture log 250 at the user device 102.

One or more inter-frame filters are then applied to the polygons to remove certain temporal variations (step 230). For example, the inter-frame filters might detect that the size of the largest polygon in a then-current frame is substantially larger (e.g., in percentage) as compared to the average size of the largest polygons from a previous set of frames and reject the then-current largest polygon as a candidate object boundary. In certain embodiments, a set of area measurements for the largest polygons in a respective set of frames are stored in a boundary attribute buffer $\mathbf{252}_k$ in the capture log 250 to facilitate the foregoing size comparison. Other attributes, including intra-buffer and/or inter-buffer measurements, can be stored in various instances of the boundary attribute buffer and/or the capture log 250. In some cases, the intra-frame filters and the inter-frame filters are applied in sequence. In these cases, any of the filters might be applied to a subset of the polygons from the frame. When the filters have been applied, a target object boundary for the frame is determined (step 240). At some moment in time (e.g., a user clicks a "Capture" button), the capture of the target capture object is executed based on the then-current target object boundary (step 206).

Figure 3A:
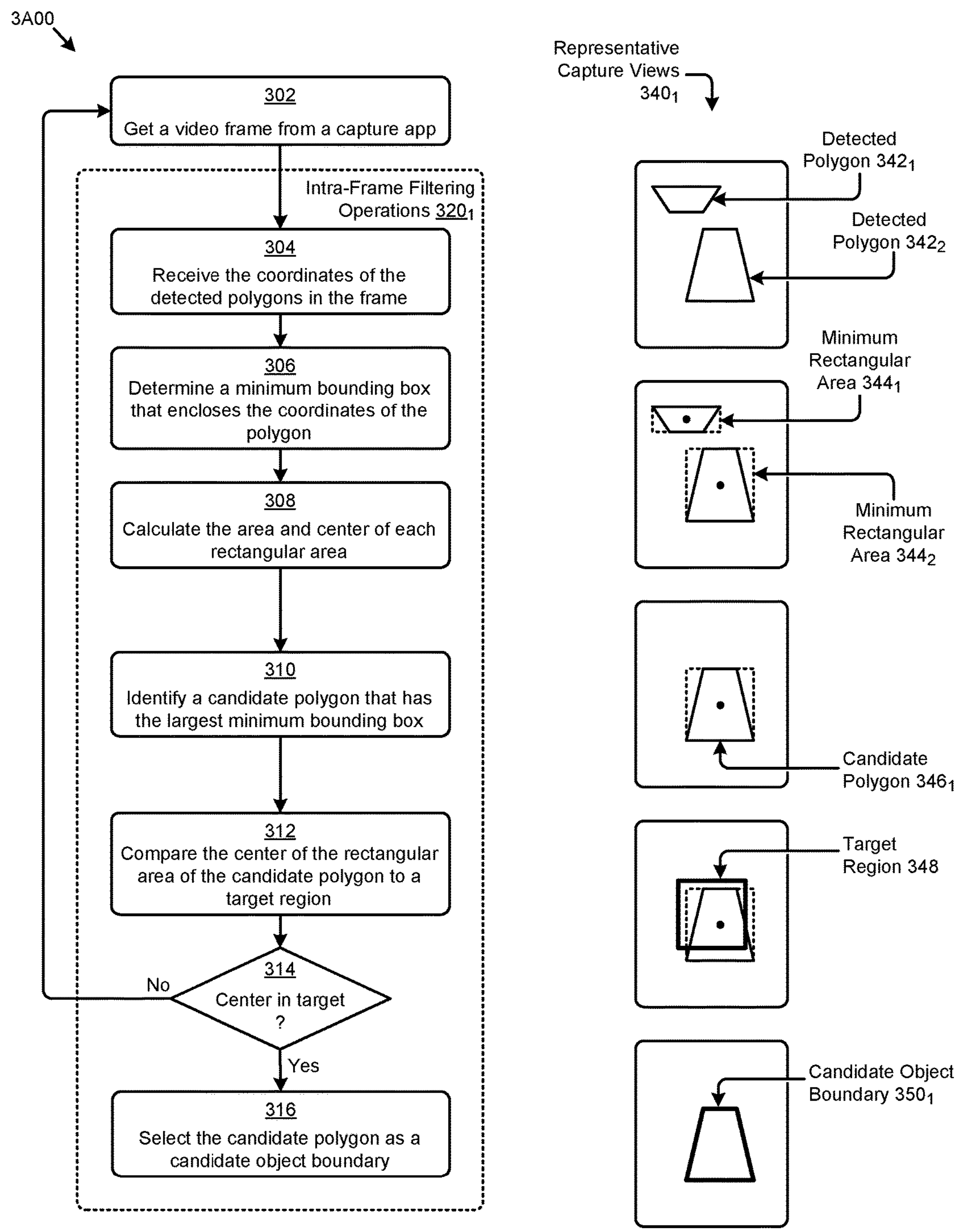
FIG. 3A presents a candidate boundary selection technique as implemented in systems that reduce capture object boundary uncertainty using intra- and inter-frame polygon filtering, according to some embodiments.
Figure 3B:
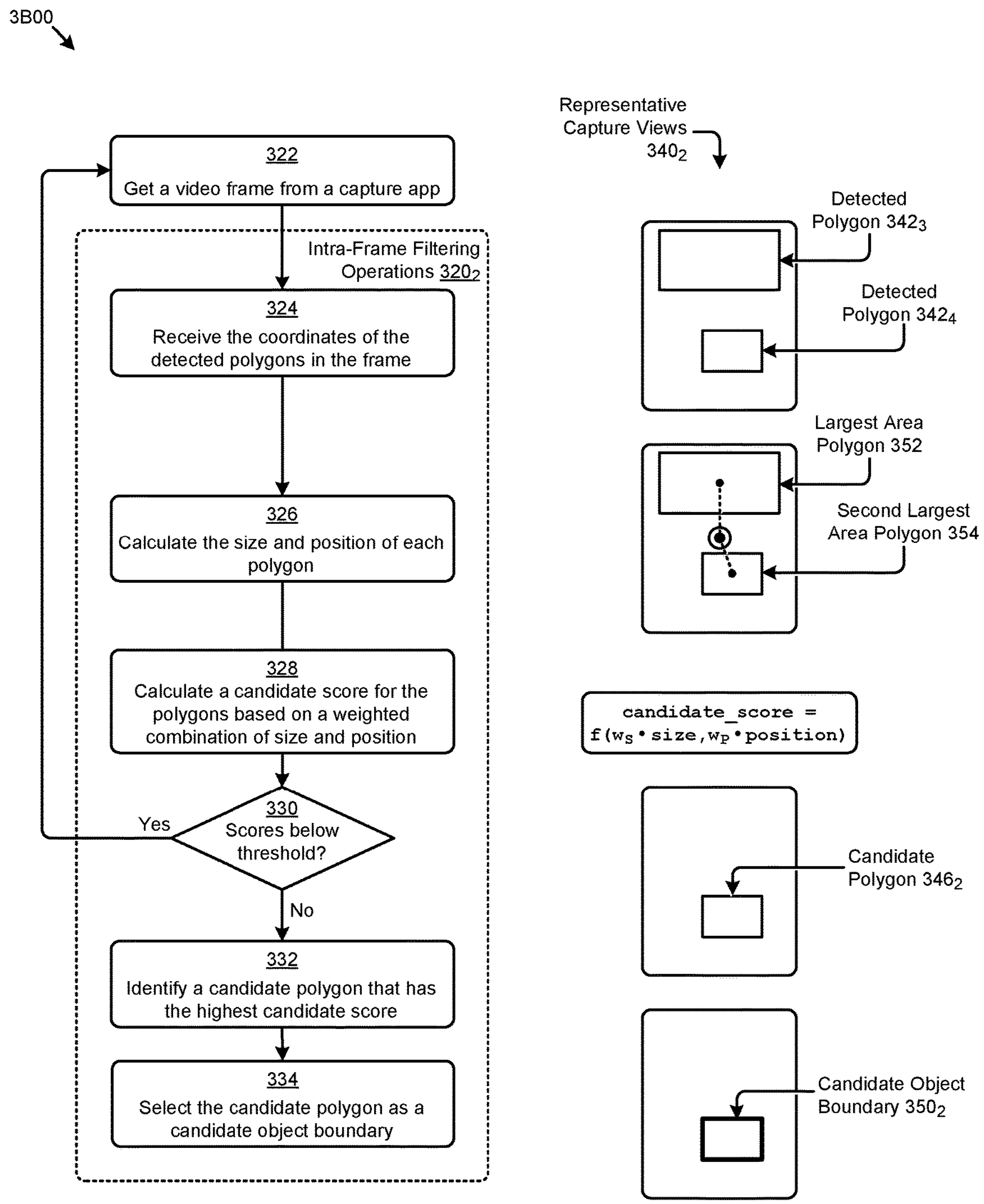
FIG. 3B presents a candidate boundary scoring technique as implemented in systems that reduce capture object boundary uncertainty using intra- and inter-frame polygon filtering, according to some embodiments.

Further details pertaining to intra-frame filtering of the polygons are presented and discussed as pertains to FIG. 3A and FIG. 3B.

FIG. 3A presents a candidate boundary selection technique 3A00 as implemented in systems that reduce capture object boundary uncertainty using intra- and inter-frame polygon filtering. As an option, one or more variations of candidate boundary selection technique 3A00 or any aspect thereof may be implemented in the context of the architecture and functionality of the embodiments described herein. The candidate boundary selection technique 3A00 or any aspect thereof may be implemented in any environment.

The candidate boundary selection technique 3A00 presents one embodiment of certain steps and/or operations that apply certain intra-frame filtering to polygons in a video frame to facilitate selection of a candidate object boundary. A set of representative capture views $\mathbf{340}_1$ are also shown to illustrate the candidate boundary selection technique 3A00. As shown, the candidate boundary selection technique 3A00 can commence by receiving a video frame from an object capture application (step 302). The video frame (and all video frames received from the capture app) is processed by a set of intra-frame filtering operations $\mathbf{320}_1$. The intra-frame filtering operations $\mathbf{320}_1$ include receiving the coordinates of the detected polygons in the frame (step 304). As an example, the coordinates of a detected polygon 3421 and a detected polygon $\mathbf{342}_2$ might be received from a native image processing API that is employed by the capture app. For each polygon, a minimum bounding box that encloses the coordinates of the polygon is determined (step 306). Rectangular areas (e.g., minimum rectangular area $\mathbf{344}_1$ and minimum rectangular area $344_2$) are determined to facilitate an efficient (e.g., fast) comparison of the polygons in the frame. Specifically, an area measurement and a set of center coordinates (e.g., X-Y coordinates) for each of the rectangular areas are calculated (step 308).

A candidate polygon (e.g., candidate polygon $346_1$) is identified as the polygon having the largest minimum bounding box (step 310). The center of the rectangular area of the candidate polygon is then compared to a target region (step 312). For example, the center of the rectangular area corresponding to candidate polygon $346_1$ is compared to target region 348. The size and position of such a target region might be predetermined based on the user device type, the user device screen size, the user device model number, and/or other characteristics of the particular user device running the capture app. If the center is in the target region (see "Yes" path of decision 314), then the candidate polygon is selected as a candidate object boundary (e.g., candidate object boundary $350_1$) associated with the then-current frame (step 316). If the center corresponding to the candidate polygon is not in the target region (see "No" path of decision 314), then no candidate object boundary is selected for the then-current frame. The premise for this decision is that a user will most often point the capture view of the user device so as to place the target object near the center of the target region.

Another embodiment of certain intra-frame filtering is shown and described as pertains to FIG. 3B.

FIG. 3B presents a candidate boundary scoring technique 3B00 as implemented in systems that reduce capture object boundary uncertainty using intra- and inter-frame polygon filtering. As an option, one or more variations of candidate boundary scoring technique 3B00 or any aspect thereof may be implemented in the context of the architecture and functionality of the embodiments described herein. The candidate boundary scoring technique 3B00 or any aspect thereof may be implemented in any environment.

The candidate boundary scoring technique 3B00 presents one embodiment of certain steps and/or operations that apply certain intra-frame filtering to polygons in a video frame to facilitate selection of a candidate object boundary based in part on candidate scores associated with the polygons. A set of representative capture views $340_2$ are shown to illustrate the candidate boundary scoring technique 3B00. As shown, the candidate boundary scoring technique 3B00 can commence by receiving a video frame from an object capture application (step 322). The video frame (and all video frames received from the capture app) is processed by a set of intra-frame filtering operations $320_2$. The intra-frame filtering operations $320_2$ include receiving the coordinates of the detected polygons in the frame (step 324). As an example, the coordinates of a detected polygon $342_3$ and a detected polygon $342_4$ might be received from a native image processing API that is employed by the capture app. The size (e.g., area measurement) and position (e.g., center coordinates) of each polygon is calculated (step 326). For example, the area measurements might indicate that detected polygon $342_3$ is a largest area polygon 352 in the frame, and detected polygon $342_4$ is a second largest area polygon 354 in the frame.

Using the foregoing polygon attributes (e.g., area and center) and/or other information, a candidate score for the polygons is calculated (step 328). As shown and described, the candidate score (e.g., "candidate_score") might be a function of a weighted size attribute (e.g., "$w_s$·size") and a weighted position attribute (e.g., "$w_p$·position"). In some cases, the value of the weighted size attribute and/or the value of the weighted position attribute are used in an alternative formula or heuristic, or scoring technique that results in a candidate score.

As one example of a scoring technique, a size attribute might correspond to an area measurement and a position attribute might correspond to a distance between the center of a particular polygon and the center of the capture view. In some cases, the candidate scores might all be below some predetermined threshold (see "Yes" path of decision 330) indicating that there are no viable candidates in the then-current frame. If there is one or more candidate scores above this threshold (see "No" path of decision 330), then the polygon with the highest candidate score is identified as a candidate polygon for the then-current frame (step 332). As illustrated in FIG. 3B, candidate polygon $346_2$, which is the second largest area polygon 354 in the frame, is selected due to the weighted combination of its size and position. The candidate polygon (e.g., candidate polygon $346_2$) is then selected as the candidate object boundary (e.g., candidate object boundary $350_2$) for the frame (step 334).

As another example of a scoring technique, a measurement (e.g., center point coordinate) or set of measurements (e.g., coordinates of vertices), or an attribute or set of attributes other than the aforementioned size attribute might correspond to variables used in determining a candidate score. One such set of measurements or attributes might correspond to a set of vectors that represent the polygon. Another such set of measurements or attributes might correspond to a shape locus and rotation. For example a predefined shape (e.g., a square) can be represented as an edge length, a rotation, and a center coordinate since the size, position and rotation of a square can be computed from just those three values. As such, any convenient measurement or set of measurements pertaining to an object being considered in calculating a candidate score can be used rather than the aforementioned size attribute. Moreover, smaller inter-frame changes (e.g., under a particular threshold value) in candidate scores might be indicative of small hand movements or device rotation, while larger inter-frame changes (e.g., over a particular threshold value) in candidate scores might be indicative of intentional retargeting by the user. The threshold values used when determining candidate object boundaries are established to be particular threshold values that correspond to the particular measurement type or types used to represent a polygon's shape, size, position and rotation.

Figure 4:
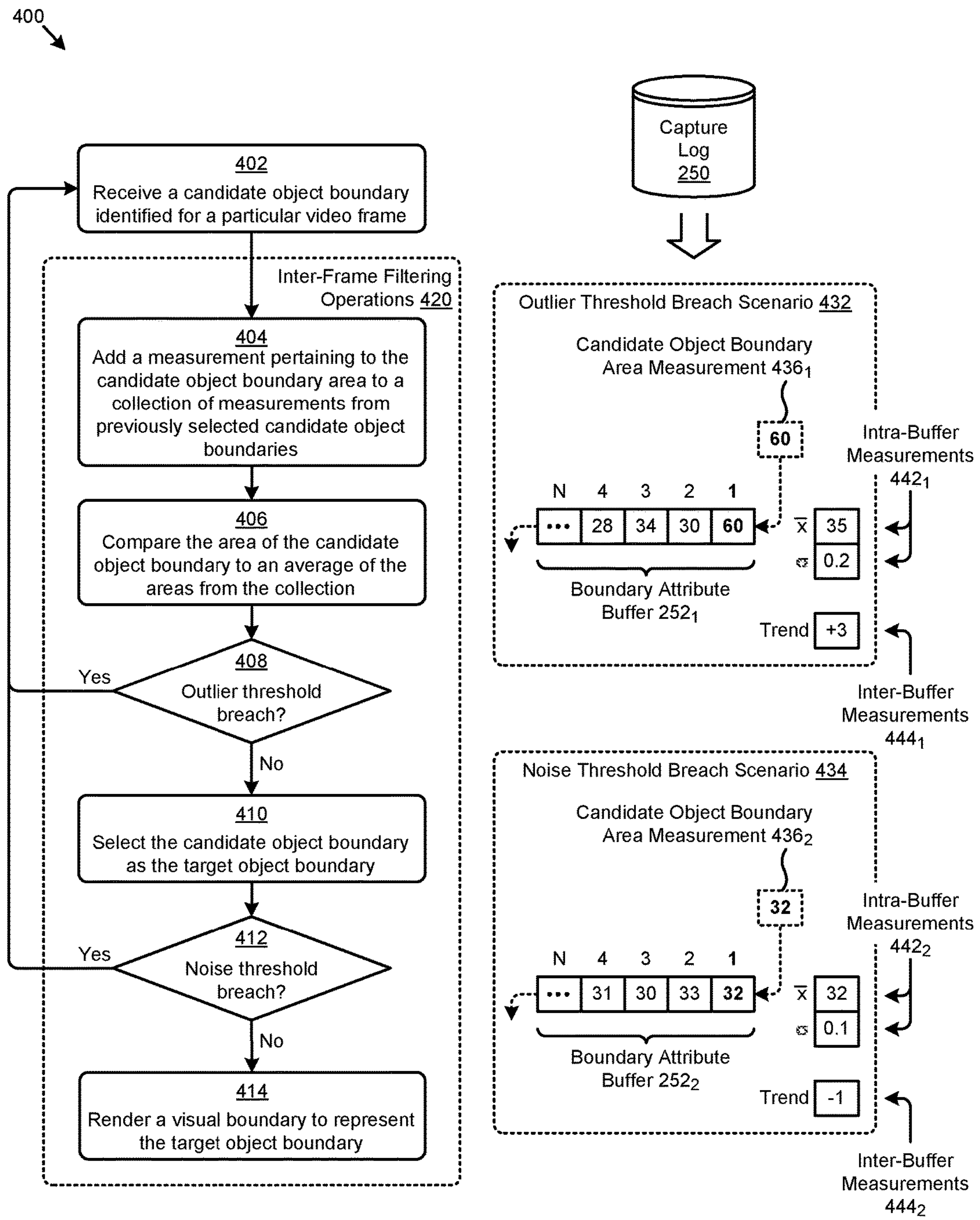
FIG. 4 depicts an inter-frame filtering technique as implemented in systems that facilitate reducing capture object boundary uncertainty using intra- and inter-frame polygon filtering, according to some embodiments.

The candidate object boundaries selected by any of the herein disclosed techniques can then be operated over by a set of inter-frame filters as shown and described as pertaining to FIG. 4.

FIG. 4 depicts an inter-frame filtering technique 400 as implemented in systems that facilitate reducing capture object boundary uncertainty using intra- and inter-frame polygon filtering. As an option, one or more variations of inter-frame filtering technique 400 or any aspect thereof may be implemented in the context of the architecture and functionality of the embodiments described herein. The inter-frame filtering technique 400 or any aspect thereof may be implemented in any environment.

The inter-frame filtering technique 400 presents one embodiment of certain steps and/or operations that apply certain inter-frame filtering to polygons from a sequence of video frames to facilitate selection of a target object boundary from a set of candidate object boundaries. Scenarios (e.g., outlier threshold breach scenario 432 and noise threshold breach scenario 434) depicting intra-buffer measurements (e.g., intra-buffer measurements $442_1$ and intra-buffer measurements $442_2$) and inter-buffer measurements (e.g., inter-buffer measurement $444_1$ and inter-buffer measurement $444_2$) derived from instances of a boundary attribute buffer (e.g., boundary attribute buffer $252_1$ and boundary attribute buffer $252_2$) are also shown to illustrate the inter-frame filtering technique 400. As shown, the inter-frame filtering technique 400 can commence by receiving a candidate object boundary identified for a particular video frame of an object capture application (step 402). For example, the candidate object boundary might be produced by the herein disclosed intra-frame filtering operations (e.g., intra-frame filtering operations $320_1$ of FIG. 3A or intra-frame filtering operations $320_2$ of FIG. 3B). The candidate object boundary (and all candidate object boundaries received from the capture app) is processed by a set of inter-frame filtering operations 420.

The inter-frame filtering operations 420 include adding measurements of the candidate object boundary area to a collection of area measurements corresponding to a set of earlier selected candidate object boundaries (step 404). As an example, data records describing such a collection of area measurements can be recorded in various instances of the boundary attribute buffer (e.g., boundary attribute buffer $252_1$, boundary attribute buffer $252_2$, etc.) stored in the capture log 250.

Specifically, the shown example instances of the boundary attribute buffer comprise a collection of N area measurements. These N area measurements correspond to an area measurement of the then-current candidate object boundary (e.g., candidate object boundary area measurement $436_1$ or candidate object boundary area measurement $436_2$), and the area measurements of N−1 earlier selected candidate object boundaries. The number N can be determined from the specific image capture device in operation and/or derived from its frame rate (e.g., at 30 fps, select N=30 to collect one second of samples in the buffer). In certain embodiments, when a data record for a new area measurement is added to the boundary attribute buffer, the data record of the oldest area measurement is evicted from the buffer to create a new instance of the buffer. In certain embodiments, the intra-buffer measurements and/or inter-buffer measurements for a particular buffer instance can be generated upon creation of the buffer instance. Specifically, as shown, a mean or average (e.g., "$\bar{x}$") of the buffer contents (e.g., measurement data records such as area measurements), a standard deviation (e.g., "σ") of the buffer data records, and/or other intra-buffer measurements can be calculated and stored. Further, inter-buffer measurements, such as a "trend" indicator to show consecutive inter-buffer increases or decreases (e.g., in the average area), can be generated. A trend indicator can be used in conjunction with a formula or logic that is applied to changes in average and standard deviation values of any particular metric. Strictly as one example, if a positive increase in the area metric is observed over several frames (i.e., the perspective of the camera is moving such that the area of the target object is correctly and steadily increasing from the device's viewpoint), then a sudden negative decrease in the trend can serve to detect an outlier-even if that decrease does not by itself (e.g., in absence of trend indication observations) cause the average or standard deviations to trigger an outlier detection. Additional example outlier processing techniques are discussed below.

According to the inter-frame filtering technique 400, the area measurement of the then-current candidate object boundary is compared to the average area measurement of the area measurements for the collection of candidate object boundaries (step 406). If the comparison results in an outlier threshold breach (see "Yes" path of decision 408), the candidate object boundary is rejected. The outlier threshold might be a predetermined value (e.g., 10%) representing the maximum allowed percent deviation of a candidate object boundary area from the average area. For example, as shown in the outlier threshold breach scenario 432, the candidate object boundary area measurement $436_1$ of "60" is over 70% higher than the area measurement average of "35". In this case, the then-current candidate object boundary is rejected as an outlier and the outlier object boundary is not considered for display. The then-previous object boundary is not changed in this iteration through the series of inter-frame filtering operations 420.

If the outlier threshold is not breached (see "No" path of decision 408), the then-current candidate object boundary is selected as the target object boundary (step 410). In some cases, while the newly selected target object boundary might be used for certain application operations (e.g., trimming a capture image), the visual boundary representing the target object boundary might not be redrawn in the capture view of the user device. Specifically, rendering a visual boundary that merely reflects a small change from a previously rendered visual boundary serves no functional purpose, but may result in a jitter that is perceivable by the user.

The inter-frame filtering technique 400 uses the aforementioned attributes and measurements to address this issue. Specifically, the difference between the area measurement of the target object boundary and the average of the area measurements for the collection of candidate object boundaries is compared to a noise threshold (decision 412). The noise threshold might be a predetermined value (e.g., 2%) representing the minimum allowed percent deviation of a target object boundary area from the average area that will invoke a re-rendering of the visual boundary. If the difference breaches (e.g., is less than) the noise threshold (see "Yes" path of decision 412), then the visual boundary is not re-rendered. For example, as shown in the noise threshold breach scenario 434, the candidate object boundary area measurement $436_2$ of "32" is equal to the area measurement average of "32". In this case, the visual boundary is not re-drawn. If the noise threshold is not breached (see "No" path of decision 412), then the visual boundary is rendered in accordance with the target object boundary (step 414). As such, results of the decision 412 (e.g., to take the "Yes" path or to take the "No" path) serve for determining whether or not to render the visual boundary on the user device display screen.

In certain situations (e.g., depending on particular implementations or variations of user devices), the visual boundary is rendered by sending a vector-based representation (e.g., shape, size, position, X-Y coordinates, etc.) of the particular one of the candidate object boundaries to a graphics processor of the image capture device. The graphics processor in turn translates the vector-based representation into pixels of a frame buffer or into formatted vector descriptors that cause the object boundary to be visually displayed on a display screen of the image capture device.

Figure 5:
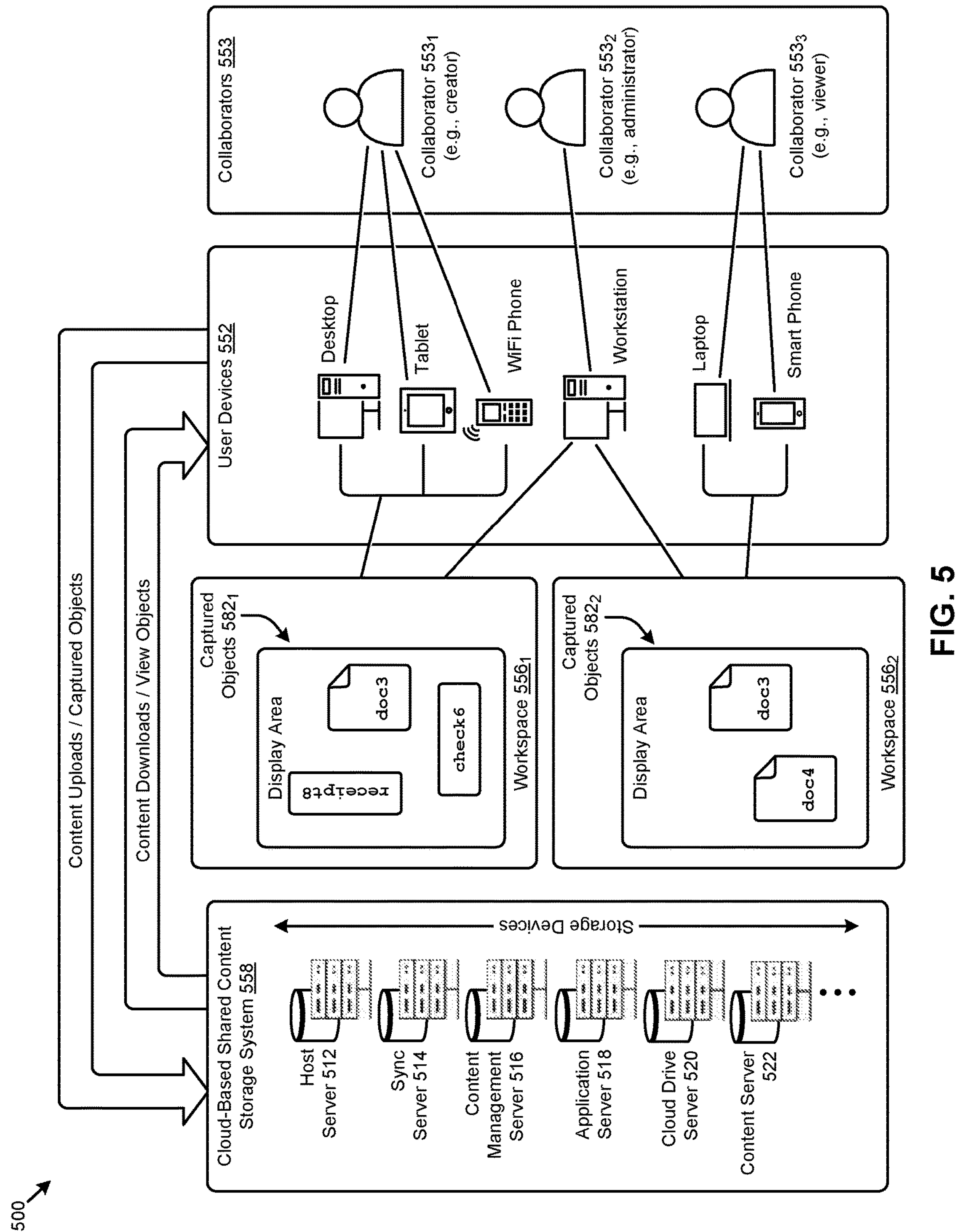
FIG. 5 presents a cloud-based environment including workspaces that are populated with content objects captured in a document capture application that reduces capture object boundary uncertainty using image filtering, according to an embodiment.

Further details pertaining to implementing the herein disclosed techniques in a cloud-based environment are described and shown as pertaining to FIG. 5.

FIG. 5 presents a cloud-based environment 500 including workspaces that are populated with content objects captured in a document capture application that reduces capture object boundary uncertainty using image filtering.

As shown in FIG. 5, certain users (e.g., collaborators 553) having various collaboration roles (e.g., creator, editor, administrator, approver, auditor, reviewer, etc.) can use one or more instances of user devices 552 to interact with one or more workspaces (e.g., workspace 556$_1$, workspace 556$_2$, etc.) facilitated by a cloud-based shared content storage system 558 in the cloud-based environment 500. As an example, collaborator 553$_1$ might be a content creator (e.g., document capture application user) with access to workspace 556$_1$, collaborator 553$_3$ might be a captured document viewer with access to workspace 556$_2$, and collaborator 553$_2$ might be an administrator with access to both workspaces. The workspaces can be stored in any location, and are at least partially maintained by components within the cloud-based shared content storage system 558. The cloud-based shared content storage system 558 supports any variety of processing elements and/or servers such as a host server 512, a sync server 514, a content management server 516, an application server 518, a cloud drive server 520, a content server 522, and/or other processing elements. The cloud-based shared content storage system 558 further facilitates access by the foregoing processing elements to any variety of storage devices.

Any of the users can be provisioned authorized access to various portions of the content objects stored in the storage devices without the additional process of manually downloading and storing a file locally on an instance of the user devices 552 (e.g., a desktop computer, a tablet, a WiFi phone, a workstation, a laptop computer, a smart phone, etc.). For example, one of the content objects (e.g., document, check, receipt, etc.) captured and uploaded by collaborator 553$_1$ might be viewed by collaborator 553$_3$ without needing to inform collaborator 553$_3$ where the file is physically stored in the storage devices of the cloud-based shared content storage system 558. Such a capability facilitates use cases that promote security as well as privacy. As one use case, content objects can be viewed on the user devices without necessitating persistent storage of the content objects on such devices. In this example use case, collaborator 553$_1$ can capture a document and upload it to the cloud-based shared content storage system 558 for collaborator 553$_2$ to view, yet without necessitating that the document be stored in persistent storage of either of the user devices 552. This use case facilitates secure custody of the data of the captured document.

More specifically, the aforementioned workspaces can facilitate access to certain captured objects by the collaborators. For example, a set of captured objects 5821 at workspace 556$_k$ might comprise a document "doc3", a check "check6", and a receipt "receipt8". Further, a set of captured objects 582$_2$ at workspace 556$_2$ comprise the document "doc3" and a document "doc4". As can be observed, document "doc3" is accessed at both workspaces to facilitate shared viewing, shared editing, and/or other collaboration operations. The herein disclosed techniques facilitate the efficacy of such collaboration in cloud-based environment 500 by reducing capture object boundary uncertainty using intra- and inter-frame polygon filtering.

ADDITIONAL EMBODIMENTS OF THE DISCLOSURE

Additional Practical Application Examples

Figure 6:
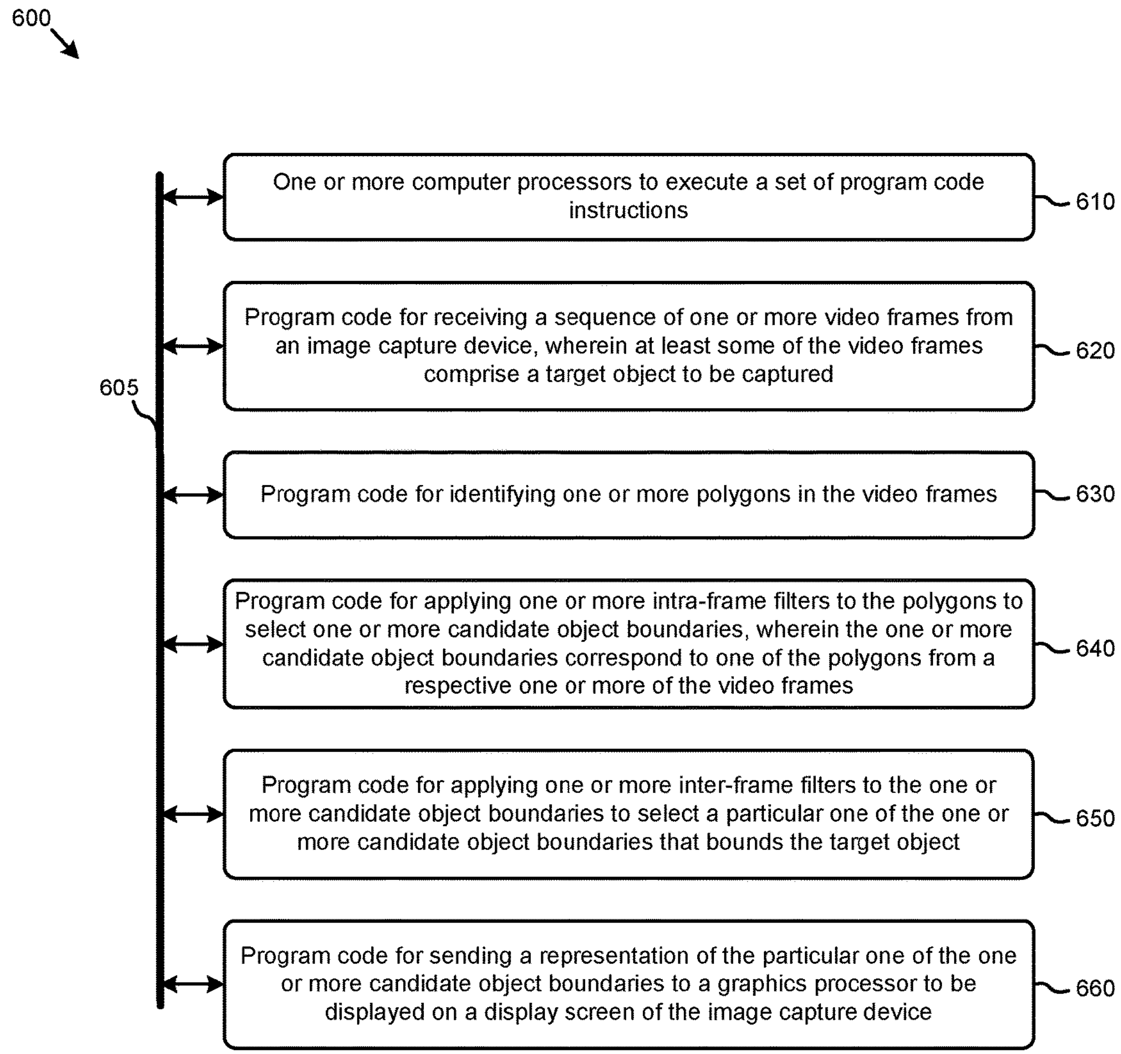
FIG. 6 depicts system components in an arrangement of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually and/or as combined, serve to form improved technological processes that address the uncertainty in determining the boundary of a target capture object. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment.

The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising one or more computer processors to execute a set of program code instructions (module 610) and modules for accessing memory to hold program code instructions to perform: receiving a sequence of one or more video frames from an image capture device, wherein at least some of the video frames comprise a target object to be captured (module 620); identifying one or more polygons in the video frames (module 630); applying one or more intra-frame filters to the polygons to select one or more candidate object boundaries, wherein the one or more candidate object boundaries correspond to one of the polygons from a respective one or more of the video frames (module 640); applying one or more inter-frame filters to the one or more candidate object boundaries to select a particular one of the one or more candidate object boundaries that bounds the target object (module 650); and sending a representation of the particular one of the one or more candidate object boundaries to a graphics processor to be visually displayed on a display screen of the image capture device (module 660).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 7A:
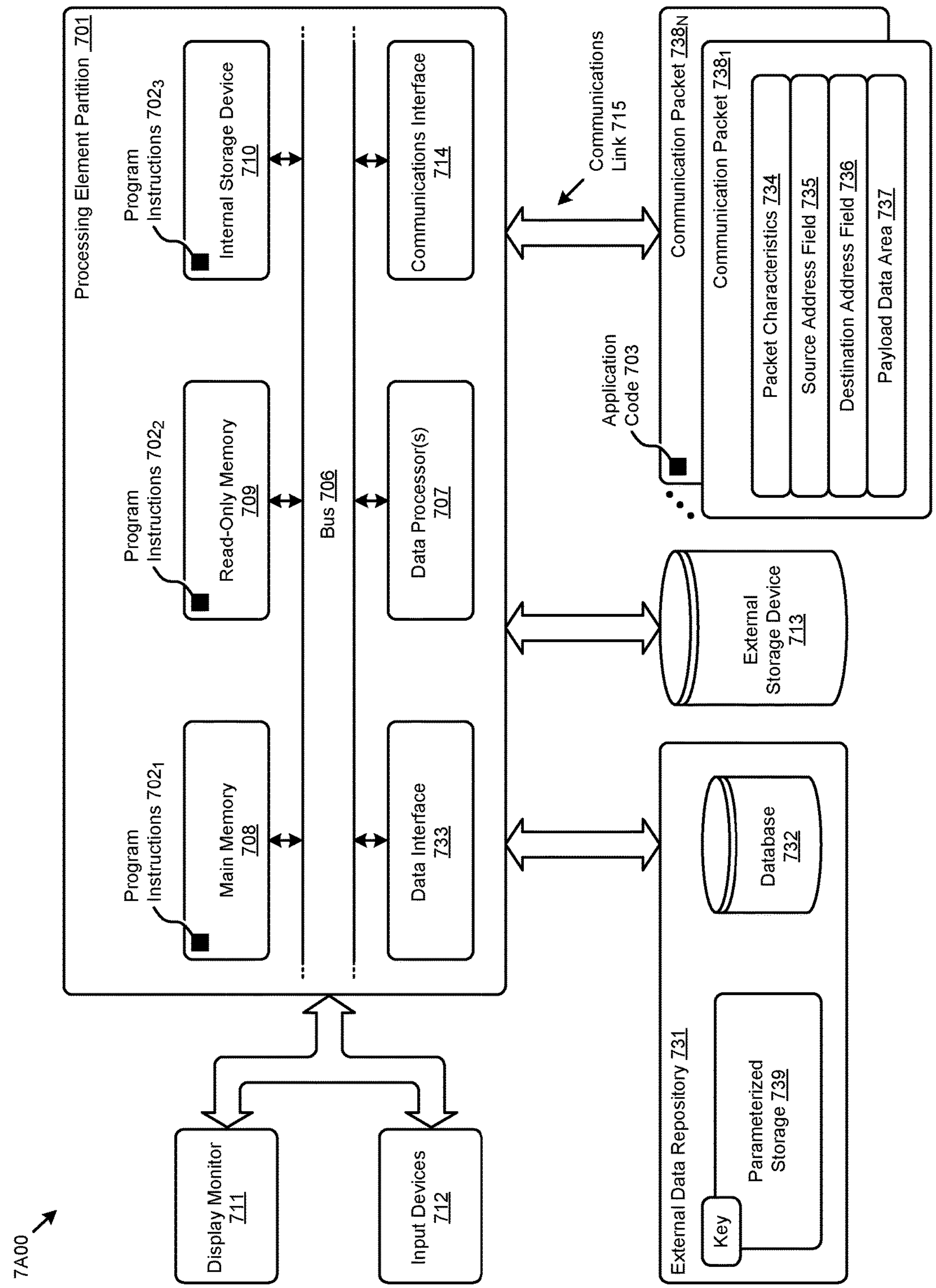
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 that is implemented within any of the aforementioned image capture devices. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., screen display such as an LCD or touchscreen), various input devices 712 (e.g., keyboard, cursor control, touchscreen, etc.), and an external data repository 731 (e.g., a flash memory card).

According to an embodiment of the disclosure, computer system 7A00 performs specific operations by data processor 707 executing one or more sequences of one or more program code instructions contained in a memory. Such instructions (e.g., program instructions $\mathbf{702}_k$, program instructions $\mathbf{702}_2$, program instructions $\mathbf{702}_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets (e.g., communications packets $\mathbf{738}_1$ and communications packets $\mathbf{738}_N$) comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases, the packet characteristics include a version identifier, a packet or payload length, a traffic class, a flow label, etc. In some cases, the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to reducing capture object boundary uncertainty using intra- and inter-frame polygon filtering. A module may include one or more state machines and/or combinational logic used to implement or facilitate the operational and/or performance characteristics pertaining to reducing capture object boundary uncertainty using intra- and inter-frame polygon filtering.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of reducing capture object boundary uncertainty using intra- and inter-frame polygon filtering). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to reducing capture object boundary uncertainty using intra- and inter-frame polygon filtering, and/or for improving the way data is manipulated when performing computerized operations pertaining to applying a filtering scheme to a set of candidate capture object polygons to achieve a quantitatively-high degree of certainty when bounding a target capture object.

Figure 7B:
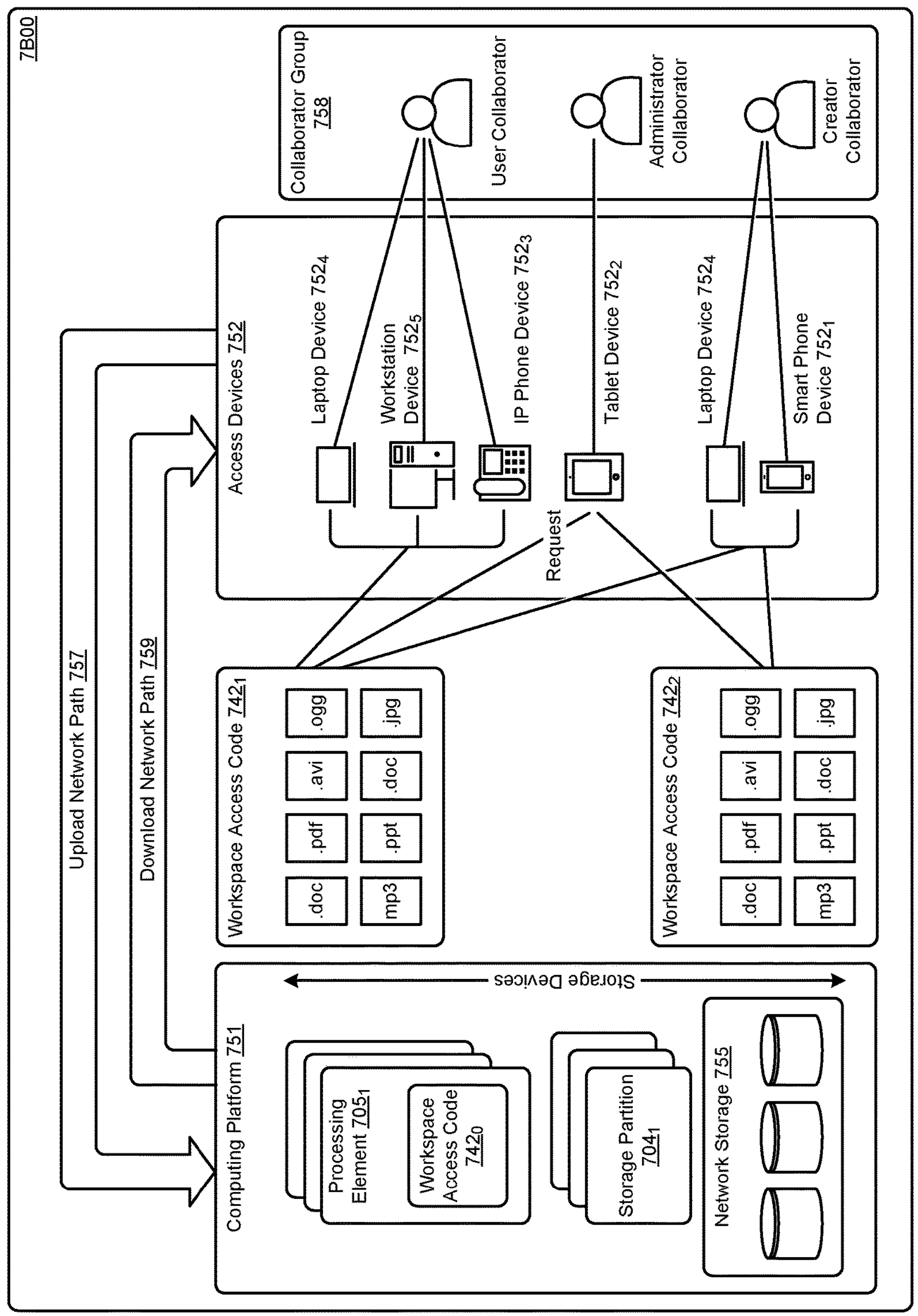

FIG. 7B depicts a block diagram of an instance of a cloud-based environment 7B00. Such a cloud-based environment supports access to workspaces through the execution of workspace access code (e.g., workspace access code 7420, workspace access code 7421, and workspace access code $742_2$). Workspace access code can be executed on any of the shown access devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as the shown networked storage 755. Storage of workspaces and/or any constituent files or objects, and/or any other code or scripts or data can be stored in any one or more storage partitions (e.g., storage partition 7041). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for reducing boundary jitter during a document image capture session, the method comprising:

receiving a sequence of one or more video frames from an image capture device, wherein at least some of the video frames comprise a target object to be captured;

identifying one or more polygons in the video frames;

applying one or more intra-frame filters to the polygons to select one or more candidate object boundaries, wherein the one or more candidate object boundaries correspond to one of the polygons from a respective one or more of the video frames;

applying one or more inter-frame filters to the one or more candidate object boundaries to select a particular one of the one or more candidate object boundaries that bounds the target object, wherein applying one or more inter-frame filters comprises:

calculating an area measurement corresponding to a minimum bounding box of the candidate polygon;

comparing the area measurement to a set of previously stored measurements to determine a variance;

selecting the candidate polygon when the variance is within a predetermined threshold; and rendering a visual boundary on a user device display screen, wherein the visual boundary corresponds to the candidate polygon; and sending a representation of the particular one of the one or more candidate object boundaries to a graphics processor to be visually displayed on a display screen of the image capture device.

2. The method of claim 1, wherein at least one of the intra-frame filters comprises a determination of at least one of the one or more candidate object boundaries based at least in part on at least one of, a polygon size, or a polygon position.

3. The method of claim 1, wherein at least one of the one or more inter-frame filters selects target object boundary based at least in part on a comparison of (i) an area measurement corresponding to one of the one or more candidate object boundaries, and (ii) an average area measurement derived from a collection of area measurements corresponding to a portion of the one or more candidate object boundaries.

4. The method of claim 3, wherein a number of area measurements to be included in the collection of measurements is based at least in part on, a frame rate, or a user device.

5. The method of claim 1, further comprising storing one or more measurement data records describing one or more attributes of the one or more candidate object boundaries in a boundary attribute buffer.

6. The method of claim 5, further comprising generating at least one of, one or more intra-buffer measurements, or one or more inter-buffer measurements, from the measurement data records stored in the boundary attribute buffer.

7. The method of claim 6, further comprising issuing one or more alerts based at least in part on a value of the intra-buffer measurements or on a value of the inter-buffer measurements.

8. The method of claim 7, wherein the one or more alerts comprises a fast panning alert or a fast zooming alert.

9. The method of claim 1, further comprising rendering a visual boundary on a user device display screen, wherein the visual boundary derives from the representation of the particular one of the one or more candidate object boundaries.

10. The method of claim 9, wherein determining whether or not to render the visual boundary on the user device display screen is based at least in part on one or more results from applying the inter-frame filters to the one or more candidate object boundaries.

11. The method of claim 1, wherein applying the one or more intra-frame filters to the polygons comprises:

determining minimum rectangular areas for the one or more polygons;

calculating a center of the minimum rectangular areas;

identifying a candidate polygon of the one or more polygons that corresponds to the largest of the minimum rectangular areas;

comparing the center of the candidate polygon to a center area of the frame; and selecting the candidate polygon when the center of the candidate polygon is in the center area.

12. A non-transitory computer readable medium having stored thereon a sequence of instructions which, when stored in memory and executed by one or more processors causes the one or more processors to perform a set of acts for reducing boundary jitter reduction during a document image capture session, the acts comprising:

receiving a sequence of one or more video frames from an image capture device, wherein at least some of the video frames comprise a target object to be captured;

identifying one or more polygons in the video frames;

applying one or more intra-frame filters to the polygons to select one or more candidate object boundaries, wherein the one or more candidate object boundaries correspond to one of the polygons from a respective one or more of the video frames;

applying one or more inter-frame filters to the one or more candidate object boundaries to select a particular one of the one or more candidate object boundaries that bounds the target object, wherein applying one or more inter-frame filters comprises:

calculating an area measurement corresponding to a minimum bounding box of the candidate polygon;

comparing the area measurement to a set of previously stored measurements to determine a variance;

selecting the candidate polygon when the variance is within a predetermined threshold; and rendering a visual boundary on a user device display screen, wherein the visual boundary corresponds to the candidate polygon; and sending a representation of the particular one of the one or more candidate object boundaries to a graphics processor to be visually displayed on a display screen of the image capture device.

13. The computer readable medium of claim 12, wherein at least one of the intra-frame filters comprises a determination of at least one of the one or more candidate object boundaries based at least in part on at least one of, a polygon size, or a polygon position.

14. The computer readable medium of claim 12, wherein at least one of the one or more inter-frame filters selects target object boundary based at least in part on a comparison of (i) an area measurement corresponding to one of the one or more candidate object boundaries, and (ii) an average area measurement derived from a collection of area measurements corresponding to a portion of the one or more candidate object boundaries.

15. The computer readable medium of claim 14, wherein a number of area measurements to be included in the collection of measurements is based at least in part on, a frame rate, or a user device.

16. The computer readable medium of claim 12, further comprising instructions which, when stored in memory and executed by the one or more processors causes the one or more processors to perform acts of storing one or more measurement data records describing one or more attributes of the one or more candidate object boundaries in a boundary attribute buffer.

17. The computer readable medium of claim 16, further comprising instructions which, when stored in memory and executed by the one or more processors causes the one or more processors to perform acts of generating at least one of, one or more intra-buffer measurements, or one or more inter-buffer measurements, from the data records stored in the boundary attribute buffer.

18. A system for reducing boundary jitter reduction during a document image capture session, the system comprising:

a non-transitory storage medium having stored thereon a sequence of instructions; and one or more processors that execute the instructions to cause the one or more processors to perform a set of acts, the acts comprising, receiving a sequence of one or more video frames from an image capture device, wherein at least some of the video frames comprise a target object to be captured;

identifying one or more polygons in the video frames;

applying one or more intra-frame filters to the polygons to select one or more candidate object boundaries, wherein the one or more candidate object boundaries correspond to one of the polygons from a respective one or more of the video frames;

applying one or more inter-frame filters to the one or more candidate object boundaries to select a particular one of the one or more candidate object boundaries that bounds the target object, wherein applying one or more inter-frame filters comprises:

calculating an area measurement corresponding to a minimum bounding box of the candidate polygon;

comparing the area measurement to a set of previously stored measurements to determine a variance;

selecting the candidate polygon when the variance is within a predetermined threshold; and rendering a visual boundary on a user device display screen, wherein the visual boundary corresponds to the candidate polygon; and sending a representation of the particular one of the one or more candidate object boundaries to a graphics processor to be visually displayed on a display screen of the image capture device.

19. The system of claim 18, wherein at least one of the intra-frame filters comprises a determination of at least one of the one or more candidate object boundaries based at least in part on at least one of, a polygon size, or a polygon position.

* * * * *